Aug. 9, 1927.
1,638,510
C. RENSHAW
OUTLET BOX
Filed Feb. 16, 1925
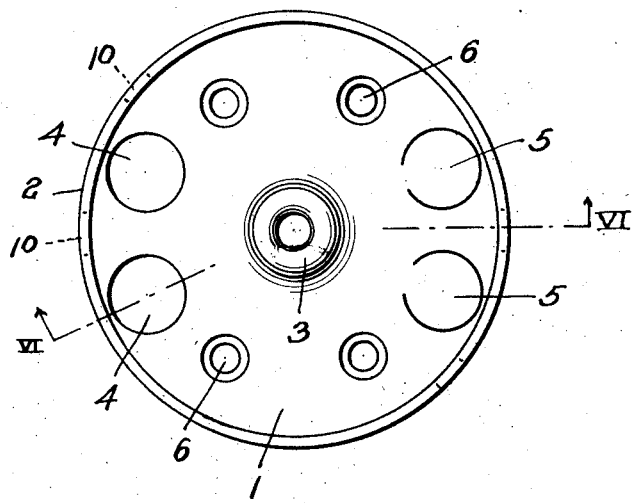
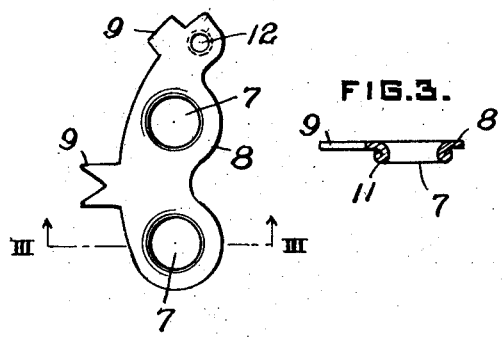
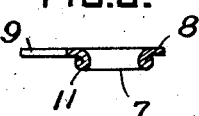
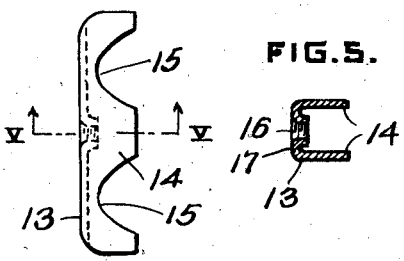
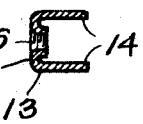
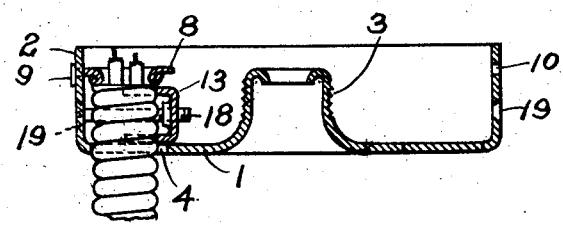
Inventor:
Clarence Renshaw,
deceased.
BY Maidee B. Renshaw,
Executrix.
WITNESSES
J. Herbert Bradley.
Percy A. English.
by Christy & Christy,
Attys.

Patented Aug. 9, 1927.

1,638,510

UNITED STATES PATENT OFFICE.

CLARENCE RENSHAW, DECEASED, LATE OF PITTSBURGH, PENNSYLVANIA, BY MAIDEE B. RENSHAW, EXECUTRIX, OF PITTSBURGH, PENNSYLVANIA, ASSIGNOR TO NATIONAL METAL MOLDING COMPANY, OF PITTSBURGH, PENNSYLVANIA, A CORPORATION OF PENNSYLVANIA.

OUTLET BOX.

Application filed February 16, 1925. Serial No. 9,560.

It is the object of the invention to provide an outlet box of the class sometimes designated as cable boxes or plates, for use in making connections with electrical conductors enclosed in flexible cables, either armored cables or those having a non-metallic sheath, which will be of simple and easily-applied construction, and which can be made economically of pressed or stamped sheet metal, as distinguished from the cast metal boxes now more commonly used.

In the accompanying drawings there is shown sufficiently for purposes of illustration a box embodying the invention in its preferred form. Figure 1 is a plan view of the open body portion of the box. Figure 2 is a plan view of one of the bushing brackets or shelves, and Figure 3 is a view in cross-section on the line III—III of Figure 2. Figure 4 is a top plan view of one of the clamping-members, and Figure 5 is a view in cross-section on the line V—V of Figure 4. Figure 6 is a view in cross-section on the line VI—VI of Figure 1, showing an armored cable secured in the box.

The body of the box comprises a base or floor 1 having an outwardly-projecting side-wall 2, and a central projecting stud 3, all preferably stamped or drawn from a single piece of sheet metal. The floor 1 is provided with openings 4 for the introduction of the cables, originally closed by the usual knockouts 5. Securance holes 6 for nails or screws are also provided in the floor. The stud 3 is here shown as hollow and externally threaded for the attachment of an electric fixture. If, as is sometimes the case, attachment is to be made to a gas-pipe, the form of the stud will be correspondingly altered. It is preferred, as shown, that the stud 3 shall be of less height (or depth) than the wall 2, and it is of advantage in the form of box body shown, that the space between the stud and the wall is open and unobstructed, so that the stud can be threaded without difficulty.

Bushings 7 for the conductors are provided, which are shown as formed in brackets or shelves 8 secured to the wall 2 above and in line with the cable openings 4 in the floor 1. One of these brackets is shown in Figure 2 in the form of a plate having two bushing openings and provided with lugs 9, the latter being passed through slots 10 in the wall 2 and bent over upon the outer face of the wall to secure the bracket firmly in place. The bushing openings 7 are drifted in the bracket, and the edge of the metal forming the opening is curled and preferably beaded as shown at 11 in Figure 3. This is preferable when armored cable is being used, the armor being cut away below the bracket and the beaded edge 11 of the opening serving to protect the bare insulation of the conductors from injury by contact with the sharp edge of the armor. The bushing brackets 8 are preferably placed a sufficient distance below the open edge of the wall 2 to permit the conductors to be bent over so as not to project above the edge, and in many cases there will thus be provided within the box body sufficient room for the necessary splices and connections. This permits the use of a flat closure or a fixture having a flat inner surface. Threaded holes, as 12, may be formed in the brackets 8 to receive the threaded shanks of attaching screws for the closure.

For securing the cable or cables in place in the box adjustable clamping-members are employed, which are located in the spaces between the respective brackets 8 and the floor of the box. The preferred form of clamping-member, which is believed to be new per se as well as in the described combination, is shown in Figures 4, 5 and 6. It consists of a channel section 13, the opposite horizontally arranged flanges or wings 14 of which are provided with vertically aligned notches 15 adapted to engage the cable, and having a threaded hole 16 in its web 17 to receive the threaded shank of an adjusting screw 18 projected through the side wall of the box and operated from the outside, the hole 16 being preferably drifted as shown. The adjusting screw 18, which preferably has a flat-surfaced head, is inserted through the hole 19 in the wall 2 and its inner threaded portion is caused to engage the thread in the hole 16 in the web of the clamping-member. Then by turning the screw the clamping-member will be drawn outwardly, and the edges of the vertically aligned notches 15 will be caused to engage the surface of the cable and bind it firmly against the inner face of the wall 2 as well as the edge of the knockout opening 4 in the floor 1. The clamping-member 13 by reason of its channeled form has a high tensile strength to resist horizontal strain, while at the same time its opposite wings 14 may take a slight flexure so that the edges of the notches 15 will engage in the grooves in the surface of the helically coiled armor when flexible armored cable is used.

The body of the box herein described may of course be a casting, but, as already stated, it is preferred to make it of wrought metal such as pressed and drawn sheet steel. Heretofore attempts to make wrought metal outlet boxes of the present type have not met with any notable degree of commercial success, and their commercial production has been confined mainly to castings. The box body of this invention is of a form which can be produced economically by pressing, and while with such a box body the accessory parts may be varied without departure from the invention, the complete combination substantially as herein shown and described is novel in structure, neat and compact, and may be readily installed under normal conditions of use.

The invention is claimed as follows:

In an outlet box having an opening for the admission of an electric cable, a cable-clamping member of channeled cross-sectional form having a web portion and projecting parallel wing portions being adapted to bear against the surface of the cable, and means projecting through the wall of the box and connected to said web portion for adjusting the clamping-member.

In testimony whereof I have hereunto set my hand.

MAIDEE B. RENSHAW,
*Executrix of Clarence Renshaw, Deceased.*